Sept. 10, 1929.  P. ALGRAIN  1,728,096
ROLLING STOCK OF RAILWAYS, TRAMWAYS, AND ROAD TRANSPORT VEHICLES
Filed Sept. 17, 1927
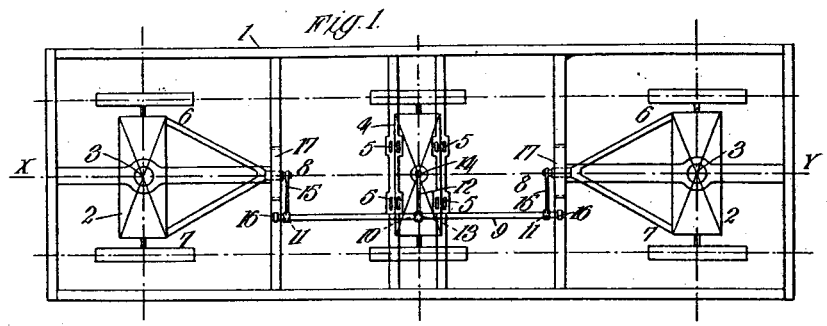
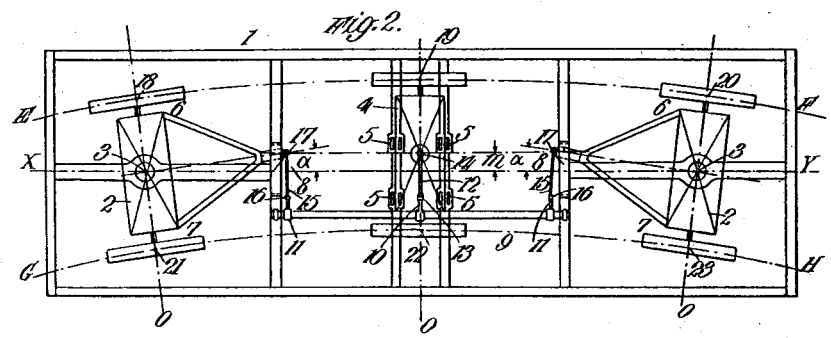
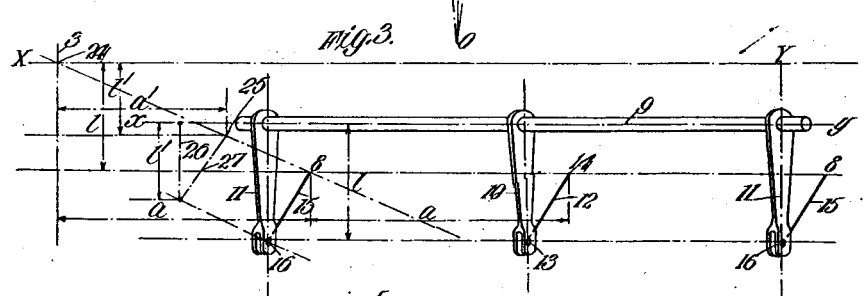
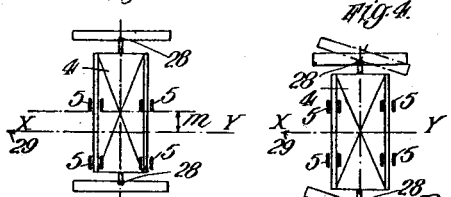
Inventor
Paul Algrain
by Wilkinson & Giusta
Attorneys.

Patented Sept. 10, 1929.

1,728,096

UNITED STATES PATENT OFFICE.

PAUL ALGRAIN, OF LA CROYERE, BELGIUM.

ROLLING STOCK OF RAILWAYS, TRAMWAYS, AND ROAD TRANSPORT VEHICLES.

Application filed September 17, 1927, Serial No. 220,194, and in Belgium September 30, 1926.

The invention relates to the rolling stock of railways, tramways or road transport and more particularly to means by which the vehicle is enabled to traverse a curved path with the minimum of friction and wear of the rolling stock.

For this purpose, it is known to ensure that the axles of the vehicle take up positions radial to the curve traversed by the provision of a central Bissell truck and of two end Bissell trucks, the central truck being easily displaceable in a direction at right angles to the central longitudinal axis of its frame and mechanically connected to the end trucks by means which cause the axles of these trucks to assume the required radial positions.

The frame of the vehicle rests on the end Bissell trucks by means of vertical pivots and on the central Bissell truck by supports adapted to slide in a direction at right angles to the longitudinal axis of the frame.

According to the invention, the rolling stock, which is of the type described, comprises a shaft rotated through an angle depending on the lateral displacement of the central Bissell truck when traversing a curved path, the angular movements of the shaft being adapted by suitable connections to ensure the radial positions of the axles of the end Bissell trucks.

The angular movement is imparted to the shaft by means of a lever secured to or integral with the shaft and connected to a rod secured to the central Bissell truck, preferably at a point in the vertical plane passing through the transverse axis of the latter.

The end Bissell trucks are pivoted at points on the longitudinal axis of the frame and the required angular movement for ensuring radiality of the axles is imparted to them by frames, substantially triangular in form, the vertices of which are respectively connected to levers secured to the rotatable shaft and parallel to the lever connected to the central Bissell truck, the members forming the said vertices being adapted to slide in guides rigid with the main frame of the vehicle and at right angles to its longitudinal axis.

The length of each of the levers controlling the end trucks is proportional to the distance between the vertex of the connecting frame and the pivot of the Bissell truck.

The connection of the rotatable shaft to the central Bissell truck by a rod situated in the transverse axial plane of the truck prevents the transmission of any horizontal torque due to differences in the forces required to displace the end trucks.

In a slight modification a rotatable shaft connected to the central Bissell truck, suitably connected to the vertices of the triangular frames of the end Bissell trucks, could be provided on each side of the central longitudinal axis, or separate shafts could be provided for each end truck.

The construction according to the invention allows perfect freedom of motion in three planes and avoids the drawbacks associated with the rigid structures of known devices for obtaining the required radiality of the axles when traversing curves. Curves of relatively small radius can be traversed safely at speeds formerly considered to be prohibitive.

The accompanying drawings show diagrammatically by way of example constructions for carrying out the invention.

Fig. 1 is a plan view of rolling stock with three Bissell trucks, the vehicle moving in a straight line.

Fig. 2 shows the rolling stock on a curve.

Fig. 3 shows in perspective the details of the arrangement connecting the central and the end trucks.

Fig. 4 shows the central Bissell truck of a road vehicle when it is required to turn the vehicle.

Fig. 5 shows the same truck when the vehicle turns in the required direction.

Referring to Figs. 1, 2 and 3, the vehicle with which the rolling stock is equipped comprises a frame 1 resting on the end Bissell trucks 2 by means of pivots 3 of which the axes are vertical, and on a central Bissell truck 4 at four points, such as 5, constituted by slides adapted to move at right angles to the axis X Y of the frame 1. The slides 5 can be replaced by rollers or by any arrangement of jointed bars which allows the displacement of the Bissell truck relatively to the frame in a direction perpendicular to its axis X Y. Each of the trucks 2 comprises an axle and the usual parts adapted to the particular kind of vehicle.

Owing to the manner in which the frame 1 rests on the Bissell trucks, the end trucks 2 can rotate about the pivots 3 and the central truck can only move relatively to the frame 1 in a direction at right angles to the axis X Y of the frame.

The displacements of the trucks which are produced when the vehicle runs on a curve ensure the radial arrangement of the three trucks by a mechanical connection comprising—

1. A rigid frame such as 6, 7, 8 of general triangular form carried by each end Bissell truck, the vertex of which is directed towards the central Bissell truck. In the example the vertices 8 of these frames are midway between the central and the end trucks.

2. A shaft 9 parallel to the axis X Y of the frame 1 and fixed to it by means of supports (not shown) which permit it to pivot on itself. On the shaft are secured three levers 10, 11 parallel to one another and of the same length. They are situated respectively in the axial vertical plane of the central Bissell truck and in vertical planes parallel to the former, and passing through the points 8.

3. A rod 12 articulated to the end 13 of the lever 10 and to a point 14 rigid with the central Bissell truck, this point being situated in the vertical axial plane of this truck, so that the reaction of the rod 12 cannot set up a torque tending to rotate the central truck 4 which would produce a resistance disadvantageous both to the action of the arrangement and to the wear of the slides 5. It is obvious that the result could be obtained equally well by duplicating the lever 10 and connecting the ends of these two levers at two points of the central truck by two rods parallel to the rod 12 and of the same length as the latter. Since the two levers are secured to the shaft 9 the rigidity of the latter obviates any undesired torque.

4. Two rods 15 parallel to the rod 12 linked by Cardan joints on the one hand to the ends 16 of the levers 11 and on the other hand to the vertices 8 of the triangular frames 6, 7, 8 of the end trucks. Each vertex 8 is formed by a member adapted to slide horizontally between cheeks 17 rigid with the frame 1. This arrangement ensures the stability of the end Bissell trucks.

Under these conditions a displacement $m$ (Fig. 2) of the central Bissell truck 4 relative to the axis X Y of the frame 1 effects, by means of the shaft 9, levers 10 and 11 and the rods 12 and 15, a symmetrical rotation of the two end Bissell trucks 2 about the pivots 3 through an angle $a$.

Also, neglecting the errors due to obliquity of the rods, errors which are smaller as the displacement $m$ is itself small, the arcs of circles E F and G H, defined respectively by the groups of points 18, 19, 20 and 21, 22, 23, can be considered to be approximately concentric, and the prolongations of the axes of the three axles to pass practically through the common centre O of these two arcs. This arrangement ensures, with an approximation sufficient for practical purposes, the radiality of the three axles when the vehicle follows a circular curve.

The arrangement in which the vertices 8 are situated midway between the trucks can also be used if these vertices are situated at other points for space considerations or other reasons. In fact, if we suppose, for example, (Fig. 3) that the axis $x\,y$ of the shaft 9 is situated in the horizontal plane of the axis X Y of the frame 1, and the line joining the vertex 8 with the axis of the pivot 3 intersects the axis X Y of the frame 1 at a point 24, then at any point 25 of the straight line 24—8 at a distance $a'$ from the axis of the pivot 3 and rigid with the corresponding end Bissell truck, a connection can be made ensuring the same angular displacement $a°$ of the end trucks for the same lateral displacement $m$ of the central Bissell truck 4. It is, in fact, sufficient to replace the lever 11 of length $l$ by a parallel lever 26 of length $l'$ such that $$\frac{l'}{l} = \frac{a'}{a}$$

the lever 26 being keyed on the extended shaft 9 parallel to the lever 11 in the vertical plane at right angles to X Y passing through the point 25, and to replace the rod 15 by a parallel rod 27 of the same length. In order not to encumber the drawing, the extension of the rod 9, the lever 26 and the rod 27 have been represented by their axes.

It is obvious that the assumption that the axes $x\,y$ of the shaft 9 should be situated in the horizontal plane of the axis X Y of the frame is not necessary. It has simply been made by way of example. The problem can be solved in an entirely analogous manner, on other assumptions. Also it is possible to increase the distance $a$ between the vertex 8 and the pivot 3, instead of decreasing it.

In the case of a vehicle on rails, the lateral displacement of the central Bissell truck 4 is imposed by the tyre flanges bearing against the rails, and the connections described automatically control the rotation of the end Bissell trucks 2 so as to realize the radiality of the three axles whatever may be the radius of the curve.

In the case of a road vehicle the lateral displacement m (Figs. 4 and 5) of the central Bissell truck 5, can be obtained by providing the wheels of this truck with steering and controlling mechanism similar to those used in automobile vehicles. Assuming that the wheels of this Bissell are mounted on vertical pivots 28 and, on leaving the position shown in Fig. 4, the vehicle is moving in the direction of the arrow 29, if the wheels are rotated into the position shown in dot and dash lines, the Bissell truck 4 will receive a movement of translation relative to the axis X Y of the vehicle, such that the wheels are not brought back into their normal direction.

At this moment the truck (Fig. 5) will be displaced through a lateral distance m corresponding, as shown previously, to the radial position of the three axles and will allow the vehicle to traverse a circular trajectory of corresponding radius.

A converse manœuvre returns the vehicle to a rectilinear trajectory.

It is obvious that modifications can be made in the form and arrangement of the elements used in carrying out the invention, the embodiment described being only diagrammatic and given by way of example.

For example, the central Bissell truck or the end Bissell trucks or all three can each be provided with two or more sets of wheels.

I claim:

1. Rolling stock of the type described for railways, tramways and road transport vehicles, comprising a shaft controlling the angular displacements of the end Bissell trucks, an angular movement of rotation being imparted to the said shaft by the displacement of the central Bissell truck in a direction at right angles to the longitudinal axis of the main frame of the vehicle, a lever rigid with said shaft, and a rod one end of which is secured to the said central Bissell truck while the other end of the rod is pivoted to said lever.

2. Rolling stock according to claim 1, in which the axis of the said rotatable shaft is arranged parallel to and at any required distance from the longitudinal axis of the central Bissell truck.

3. Rolling stock according to claim 1, in which the said rod lies in the vertical plane containing the transverse axis of the central Bissell truck.

4. Rolling stock according to claim 1, comprising also two levers (11) rigid with said rotatable shaft (9) and parallel to said first mentioned lever (10), and means, respectively, connected to said two levers (11) for effecting the required angular displacements of said end Bissell trucks.

5. Rolling stock according to claim 1, comprising also two levers (11) rigid with said rotatable shaft (9) and parallel to said first mentioned lever (10), and means, respectively, connected to said two levers (11) for effecting the required angular displacements of said end Bissell trucks, said means including a frame, substantially of triangular form, secured, respectively, to each end Bissell truck.

6. Rolling stock according to claim 1, comprising also two levers (11) rigid with said rotatable shaft (9) and parallel to said first mentioned lever (10), means, respectively, connected to said two levers (11) for effecting the required angular displacements of said end Bissell trucks, said means including a frame, substantially of triangular form, secured respectively, to each end Bissell truck, and vertical pivots secured, respectively, to the main frame of the vehicle about which pivots said triangular frames can rotate.

7. Rolling stock according to claim 1, comprising also two levers (11) rigid with said rotatable shaft (9) and parallel to said first mentioned lever (10), means, respectively, connected to said two levers (11) for effecting the required angular displacement of said end Bissell trucks, said means including a frame, substantially of triangular form, secured, respectively, to each end Bissell truck, links (15) connecting said two levers (11), respectively, with the vertices (8) of said frames, and means constraining said vertices to move in a direction at right angles to the longitudinal axis of the main frame of the vehicle.

8. Rolling stock according to claim 1, comprising also two levers (11) rigid with said rotatable shaft (9) and parallel to said first mentioned lever (10), means, respectively, connected to said two levers (11) for effecting the required angular displacement of said end Bissell trucks, said means including a frame, substantially of triangular form, secured, respectively, to each end Bissell truck, links (15) connecting said two levers (11), respectively, with the vertices (8) of said frames, and cheeks extending horizontally at right angles to the longitudinal axis of the main frame of the vehicle and secured to said frame, said vertices sliding on said cheeks.

9. Rolling stock according to claim 1, comprising also two levers (11) rigid with said rotatable shaft (9) and parallel to said first mentioned lever (10), means, respectively, connected to said two levers (11) for effecting the required angular displacements of said end Bissell trucks, said means including a frame, substantially of triangular form, secured, respectively, to each end Bissell truck, and vertical pivots secured, respectively, to the main frame of the vehicle about which pivots said triangular frames can rotate, the length of said levers (11) being proportional to the distance between the vertex of said triangular frame and said pivot.

10. Rolling stock of the type described for railways, tramways and road transport vehicles, comprising a shaft controlling the angular displacements of the end Bissell trucks, an angular movement of rotation being imparted to the said shaft by the displacement of the central Bissell truck in a direction at right angles to the longitudinal axis of the main frame of the vehicle, a lever rigid with said shaft, a rod one end of which is secured to the said central Bissell truck while the other end of the rod is pivoted to said lever, pivots secured to the main vehicle frame, a frame substantially of triangular form secured, respectively, to said end Bissell trucks and rotatable about said pivots, and means connecting said triangular frames and said shaft by which the radiality of the end Bissell trucks is ensured.

11. Rolling stock of the type described for railways, tramways and road transport vehicles, comprising a shaft controlling the angular displacements of the end Bissell trucks, an angular movement of rotation being imparted to the said shaft by the displacement of the central Bissell truck in a direction at right angles to the longitudinal axis of the main frame of the vehicle, a lever rigid with said shaft, a rod one end of which is secured to the said central Bissell truck while the other end of the rod is pivoted to said lever, pivots secured to the main vehicle frame at the longitudinal axis thereof, a frame substantially of triangular form secured, respectively, to said end Bissell trucks and rotatable about said pivots, and means connecting said triangular frames and said shaft by which the radiality of the end Bissell trucks is ensured.

In testimony whereof I have signed my name to this specification.

P. ALGRAIN. [L. S.]